United States Patent [19]

Umezawa et al.

[11] Patent Number: 4,684,407
[45] Date of Patent: Aug. 4, 1987

[54] HYDRAULIC CEMENT COMPOSITION AND PROCESS FOR PRODUCING CEMENT SHAPINGS

[75] Inventors: Norihiro Umezawa, 8-9, Azaohara, Oda, Kakuda-shi, Miyagi; Kazuyuki Hata, Mie, both of Japan

[73] Assignees: Mitsubishi Yuka Fine Chemicals Co., Ltd., Tokyo; Norihiro Umezawa, Kakuda, both of Japan

[21] Appl. No.: 796,065

[22] Filed: Nov. 8, 1985

[30] Foreign Application Priority Data

Nov. 14, 1984 [JP] Japan ................. 59-240099

[51] Int. Cl.$^4$ ............................. C04B 24/20
[52] U.S. Cl. ....................... 106/90; 106/315
[58] Field of Search .................. 106/90, 315

[56] References Cited

U.S. PATENT DOCUMENTS

| B 465,955 | 2/1976 | Schaupp ................. 106/90 |
| 3,642,969 | 1/1972 | Estranda ................ 264/333 |
| 4,441,929 | 4/1984 | Marcellis et al. ......... 106/90 |
| 4,447,266 | 5/1984 | Nachfolger .............. 106/90 |

FOREIGN PATENT DOCUMENTS

| 0025143 | 3/1981 | European Pat. Off. . |
| 2399984 | 6/1979 | France . |
| 58-26061 | 2/1983 | Japan ................. 106/90 |
| 60-21839 | 2/1985 | Japan ................. 106/90 |
| 1040626 | 9/1966 | United Kingdom . |
| 1320365 | 6/1973 | United Kingdom . |
| 1343418 | 1/1974 | United Kingdom . |
| 1581037 | 12/1980 | United Kingdom . |

*Primary Examiner*—William R. Dixon, Jr.
*Assistant Examiner*—Steven Capella
*Attorney, Agent, or Firm*—Oblon, Fisher, Spivak, McClelland & Maier

[57] ABSTRACT

A hydraulic cement composition containing specific additives and a process for producing a cement shaping using the same are disclosed. The hydraulic cement composition can be easily placed within a framework and provide a cement shaping having an improved compressive strength and an excellent appearance.

10 Claims, No Drawings

HYDRAULIC CEMENT COMPOSITION AND PROCESS FOR PRODUCING CEMENT SHAPINGS

FIELD OF THE INVENTION

The present invention relates to a process for producing cement shapings within a very short period (1 to 3 hours) by rapid high temperature curing. The invention also relates to a hydraulic cement composition useful in this process.

BACKGROUND OF THE INVENTION

Cement shapings include cement, mortar and concrete products used in civil engineering and construction fields such as asbestos cement plates, pulp cement plates, wood wool cement plates, wood chip cement plates, GRC (glass fiber-reinforced cements), cement roof tiles, mortar plates, terrazzo blocks, concrete plates, concrete piles, Hume concrete pipes, U-shaped grooves, concrete blocks, tetrapods, concrete ties and ALC (Autoclaved Light-weight Concrete).

Although varying depending on product types, the conventional methods for producing concrete shapings generally comprise compounding Portland cement, water and aggregates, kneading these materials, filling the mixture into a framework, pre-curing the mixture at ordinary temperatures (ambient temperature) for 2 to 4 hours, elevating the temperature of the pre-cured product to 60° to 70° C. using steam at a rate of 11° to 33° C./hr, maintaining the curing temperature between 60° and 70° C. for 4 to 8 hours, stopping the supply of steam, and allowing the cured product to cool under natural conditions for 6 to 12 hours before removing the framework. (see Unexamined Published Japanese Patent Application Nos. 20252/80, 22151/82, Japanese Patent Publication No. 17871/82, and Technical Bulletin No. L-001, "Steam Curing-Report of ACI 517 Committee", published by Nisso Master Builders Co., Ltd., August, 1965).

The productivity of the conventional process is 1 to 3 cycles per day, which means 1 to 3 lots of cement shapings can be produced a day. If the production time is simply shortened to increase the process productivity, thoroughly hardened concrete products are not obtained. If the pre-curing time is shortened while the temperature elevation rate and curing temperature are increased, the structural integrity of cement shapings is impaired and products with such defects as expansion, blistering or cracking will result.

A method has been proposed to shorten the shaping cycle of the conventional steam curing process as described in Unexamined Published Japanese Patent Application No. 110420/75. This method comprises providing a hydraulic cement composition by compounding normal Portland cement with at least 5 wt% of early strength cement (i.e., a mixture of calcium aluminate, lime and gypsum), and optional components such as sodium carbonate and organic acids (e.g., gluconic acid, citric acid, tartaric acid, and Na or K salts thereof), and an aluminum powder (as a foaming agent), water and fine aggregates; placing the composition in a framework; precuring the composition for 1 to 2 hours; steam curing the pre-cured product at high temperature and pressure (180° C. and 10 atmospheric pressure, with the temperature elevated at a rate of 80° C./hr) or steam curing the same at atmospheric pressure (60° C. with the temperature elevated at a rate of 40° C./hr); cooling the cured product to room temperature over a period of 4 to 5 hours; and disassembling the framework to recover a lightweight shaped cement product having a compressive strength of 82 to 90 kg/cm$^2$.

This method aims at shortening the shaping cycle by increasing the rate of temperature elevation after placing the hydraulic cement composition in a framework, but the result thereof is far from being satisfactory since considerable pre-curing time is necessary and as many as 5 to 6 hours are required until the steam-cured product cools down sufficiently to permit the disassembling of the framework.

The present inventors previously made various studies on cement admixtures to check whether the precuring step and the cooling step subsequent to steam curing would be necessary at all. As a result, the inventors obtained the following observations: if a specific sulfate is used as a cement additive, the cement composition shaped in an open framework need not be pre-cured and can be immediately cured at a temperature of 80° C. or higher by employing a temperature elevation rate of 40° C./hr upward; this rapid and high temperature curing produces a sound and immaculate cement shaping in 1 to 3 hours; and the productivity of this method is at least 10 cycles/day. On the basis of these findings, the present inventors filed Japanese Patent Application No. 125571/83 on a process for producing a cement shaping comprising placing in a framework a hydraulic cement composition comprising a hydraulic cement and 0.1 to 20 wt% of at least one additive selected from the group consisting of sulfate salts of lithium, aluminum, potassium and thallium, as well as sulfate complex salts containing these metals, and curing the shaped cement composition at elevated temperatures.

SUMMARY OF THE INVENTION

The present invention provides an improvement of the prior art.

An object of the present invention is to provide a hydraulic cement composition which can be easily placed within a framework and yield a cement shaping having an improved compressive strength and appearance.

In accordance with the present invention, the time during which a hydraulic cement composition maintains a flowability suitable for the placement work can be extended in a necessary and sufficient degree by using the sulfate proposed in the prior art in combination with another specific additive.

DETAILED DESCRIPTION OF THE INVENTION

One embodiment of the present invention is to provide a hydraulic cement composition comprising 100 parts by weight of cement, from 0 part by weight to a suitable amount of a fine aggregate, from 0 part by weight to a suitable amount of a coarse aggregate, a suitable amount of water and 2 to 20 parts by weight of an additive having the following composition:

(a) 1 part by weight of at least one sulfate selected from sulfuric acid salt of aluminum and a sulfuric acid complex salt of aluminum;

(b) 0.1 to 1 part by weight of a water reducing agent selected from a condensation product of sodium naphthalenesulfonate and formalin, a condensation product of melamine resin sodium sulfonate and formalin, a condensation product of calcium naphthalenesulfonate and formalin, and a condensation product of melamine resin calcium sulfonate and formalin; and (c) 0 to 5 parts by weight of a silicic compound particle selected from Akakura pozzolan having a particle size of 1 to 50 μm, and $Al_2O_3.3SiO_2$, $ZrSiO_4$, diatomaceous earth, bentonite, quartz sand, kaolin, CaSi dust, silica fume and $Na_2O.SiO_2$, each having a particle size of 5 μm or less.

Another embodiment of the present invention is to provide a process for producing a cement shaping comprising:

(1) providing a hydraulic cement composition comprising 100 parts by weight of cement, from 0 part by weight to a suitable amount of a fine aggregate, from 0 part by weight to a suitable amount of a coarse aggregate, a suitable amount of water and 2 to 20 parts by weight of an admixture having the following composition:

(a) 1 part by weight of at least one sulfate salt selected from sulfuric acid salt of aluminum and sulfuric acid complex salt of aluminum (b) 0.1 to 1 part by weight of a water reducing agent selected from a condensation product of sodium naphthalenesulfonate and formalin, a condensation product of melamine resin sodium sulfonate and formalin, a condensation product of calcium naphthalenesulfonate and formalin, and a condensation product of melamine resin calcium sulfonate and formalin (c) 0 to 5 parts by weight of a silicic compound particle selected from Akakura pozzolan having a particle size of 1 to 50 μm, and $Al_2O_3.3SiO_2$, $ZrSiO_4$, diatomaceous earth, bentonite, quartz sand, kaolin, CaSi dust, silica fume and $Na_2O.SiO_2$, each having a particle size of 5 μm or less (2) placing the hydraulic cement composition in a framework; and (3) curing the composition at a temperature between 80° and 110° C.

The cement used in the present invention is a hydraulic cement such a normal Portland cement, early strength Portland cement, moderate heat portland cement, sulfate resistant portland cement, white portland cement, portland blast-furnace slag cement, silica cement and fly ash cement.

Examples of the fine aggregate include river sand, crushed sand, quartz sand and artificial lightweight sand. These are used in amounts ranging from 0 part by weight to a suitable amount per 100 parts by weight of the cement. In order to make mortar and concrete products, the proportion of the fine aggregate is from 100 to 300 parts by weight per 100 parts by weight of the cement. The coarse aggregate is generally made of river gravels and crushed stone. Coarse aggregate is not used if the product obtained is a mortar shaping. If concrete shapings are produced, the corase aggregate is generally used in an amount of 200 to 400 parts by weight in combination with 27 to 45% by weight of the fine aggregate.

The respective components of the cement additive are described below.

The sulfate as component (a) is sulfuric acid salt of aluminum or sulfuric acid complex salt of aluminum, such as $NH_4AlSO_4$. These salts and complex salts may be an anhydrous or hydrated form such as $Al_2(SO_4)_3.14-18H_2O$. The salts and complex salts may be used in the form of a powder or an aqueous solution.

Component (b) is a water reducing agent added to improve the flowability of the cement formulation. Component (b) is selected from a condensation product of sodium naphthalenesulfonate and formalin, a condensation product of melamine resin sodium sulfonate and formalin, a condensation product of calcium naphthalenesulfonate and formalin, and a condensation product of melamine resin calcium sulfonate and formalin. The condensation products of formalin and calcium or sodium naphthalenesulfonate are not limited to those involving sodium or calcium naphthalenesulfonate a the sole component of condensation with formalin, and they may be condensation products of formalin with sodium or calcium sulfonates of polycyclic aromatic compounds such as naphthalene, alkylnaphthalene, biphenyl and anthracene.

The preferred example of the melamine resin sodium sulfonate/formalin condensate is a compound of the formula

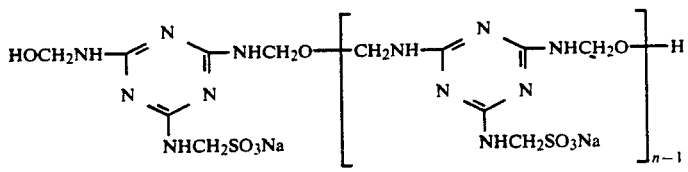

wherein n ≧ 2.

The silicic compound particle as component (c) is selected from $Al_2O_3.3SiO_2$, $ZrSiO_4$, diatomaceous earth, bentonite, quartz sand, kaolin, CaSi dust, Akakura pozzolan, $Na_2O.SiO_2$ and silica fume. These silicic compound particles contribute to improve the compressive strength of cement shapings and their appearance (smoothness). Silica fume is a mist or submicron particles collected from an electric furnace as an intermediate of the smelting of silicon or ferrosilicon. Silica fume is also known a microsilica and has a specific surface area of about 2 to $3 \times 10^5$ $cm^2/g$ and an average particle size of about 0.1 μm. Major silica fume producing countries are the United States of America, USSR, Norway and Japan. The product of Norway has the following typical composition, in % by weight:

90 to 96.0% $SiO_2$,
0.2 to 0.8% $Fe_2O_3$,
0.1 to 0.5% CaO,
0.4 to 1.0% $K_2O$,
0.1 to 0.4% S,
0.3 to 3.0% $Al_2O_3$,
0.5 to 1.5% MgO,
0.2 to 0.7% $Na_2O$,
0.5 to 2.7% C, and
0.7 to 2.8% LOI (Loss On Ignition)

If $Na_2O.SiO_2$ is used as component (c), the particles which pass a 200 mesh sieve as specified in the JIS should be selected.

The additive has a composition comprising 1 part by weight of the sulfate as component (a), 0.1 to 1 part by weight of the water reducing agent as component (b), and 0 to 5 parts by weight, preferably 0.1 to 3 parts by weight, of the silicic compound particle as component (c). The additive is used in a proportion of 2 to 20 parts by weight, preferably 3 to 10 parts by weight, per 100 parts by weight of the cement. Excessive use of the additive should be avoided since such undesirably reduces the mechanical strength of the final cement shaping.

In addition to the additive, the cement composition may optionally contain a resin filler, pigment, air entraining agent (AE agent) or a thickener.

Air entraining agents increase the volume of air in concretes and are generally considered to be unsuitable for use in high temperature curing. However, if they are used in combination with the salts or complex salts specified as component (a), the finally obtained cement shaping has both good surface properties and a desired internal structure in that neither blisters nor expansion occurs in the surface or internal structure of the cement. This is assumed that because thermal expansion of air entrained by the AE agent is effectively inhibited by the skeleton which is formed in the early stage of curing. Whatever the reason may be, an AE agent can be used in the process of the present invention without causing cement expansion. The functions of the AE agent added are exhibited sufficiently to produce a cement shaping having an improved resistance to freezing and thawing cycles.

The hydraulic cement composition in accordance with the first embodiment of the present invention can be shaped by either hardening through cold temperature curing or high speed centrifugation. From an efficiency viewpoint, shaping by rapid curing at temperatures of 80° C. or more is preferred.

More specifically, a hydraulic cement, the salt or complex salt specified above, a condensation product of sodium naphthalenesulfonate and formalin, a condensation product of melamine resin sodium sulfonate and formalin, a condensation product of calcium naphthalenesulfonate and formalin or a condensation product of melamine resin calcium sulfonate and formalin, the silicic compound particle specified above, water and an aggregate (either a fine aggregate such as sand or a coarse aggregate such as gravel or crushed stone, or both), and an optional additive such as an accelerator, retarder or water reducing agent are compounded and mixed; the mixture is placed in a framework and heated to 80° C. or higher at a temperature elevation rate of 40° C./hr upward; the cement composition is subjected to rapid and high temperature curing for 1 to 3 hours under atmospheric pressure at a temperature of 80° C. or higher.

After placement in the framework, the cement paste may be pre-cured at ordinary temperatures, but in order to increase the process efficiency, the temperature of the paste placed in the framework is usually elevated at a rapid rate without pre-curing. The rate at which the temperature is elevated should be at least 40° C./hr, and preferably between 60 and 120° C./hr. This range can be used without causing any adverse effects on the cement shaping obtained. The curing temperature is at least 80° C., preferably between 90° and 110° C., and this temperature may be maintained for a period of 15 to 60 minutes. If temperatures higher than 100° C. are used, an airtight curing apparatus is necessary and the shaped cement wrapped with a sheet is passed through pressurized steam.

A heating medium suitable for use in the curing step is the hot and pressurized steam commonly used in the ordinary steam curing. Other heat curing methods can be used, including electric curing, electric heat curing, high frequency curing, heated air curing and infrared radiation curing.

After the high temperature curing described above, the cement shaping is immediately taken out of the framework, thereby completing all the processing steps. In order to increase the heat efficiency of curing, the shaping may be subjected to soaking (cooling under natural conditions) for a suitable period ranging from 10 minutes to 2 hours.

The cement shaping (cement, mortar or concrete product) obtained by curing for 1 to 3 hours has no such defects as expansion, blisters or cracks in either the surface or the internal structure. The product has the necessary and sufficient strength (100 to 200 kg/cm$^2$) that withstands removal from a disassembled framework, and the strength of the demolded product is enhanced by the same degree as in the case of the conventional steam-cured product.

The advantages of the present invention are believed to result from the fact that in the rapid and high temperature curing of the hydraulic cement composition, the salt or complex salt as component (a) forms a skeleton which prevents expansion, blistering or cracking of the cement composition while accelerating its hardening.

The hydraulic cement composition in accordance with the first embodiment of the present invention has such a high flowability that it can be easily placed within a framework. The composition requires a very short time to develop a compressive strength of at least 110 kg/cm$^2$ as soon as it is removed from the framework. In accordance with the present invention, a cement shaping having a smooth surface can be produced at atmospheric pressure using an open framework. Unlike the conventional high temperature and pressure steam curing process, the method of the present invention does not require to maintain a high vapor pressure within a sealed compartment and can be conducted with the conventional atmospheric steam curing apparatus having no special pressure holding means. A further advantage of the process of the invention is that it can be conducted with an ordinary open framework, rather than a closed framework that requires high initial and running costs.

To summarize the advantages of the present invention, it permits rapid high temperature curing safely and without causing any expansion problems, so that objectives such as the development of high early strength, the shortening of the curing time and the increase in process efficiency can be attained without an excessive increase in the initial and running costs of the framework or the curing apparatus. In terms of the quality of the cement shaping, the volume of voids having relatively large radii is decreased, the resistance of the product to freezing and thawing cycles is improved, and neutralization of the product is inhibited.

Shown below are examples of the present invention, wherein hydraulic cement compositions containing various additives in various amounts were steam-cured, and the results are shown in Tables 1 to 4.

EXAMPLE 1

Cement compositions were prepared by compounding 100 parts by weight of normal Portland cement, 200 parts by weight of normal sand, 45 parts by weight of water, and additives shown in Table 1 below.

While the cement compositions had a flow value of 110 mm or more, they were charged into an open stainless steel framework which was vibrated to remove any blisters. The temperature of the composition was elevated from 30° C. to 100° C. over a period of 1 hour and steam curing was conducted at 100° C. for 60 minutes. Thereafter, the supply of steam was stopped and the framework was immediately disassembled to remove the morta shaping. The compressive strength of each of the recovered mortar shapings was measured in accordance with JIS R 5201 (1977). The general appearance of each shaping was also checked visually in terms of the presence, size and number of expansions, blisters, and cracks. All of the shapings tested had an excellent appearance and were found to have completely hardened.

The silica fume used was a Norwegian product, and had a particle size distribution of 0.01 to 0.2 μm and the following composition:

89.06% $SiO_2$,
1.89% $Fe_2O_3$,
0.67% $K_2O$,
1.3% C,
2.60% LOI,
0.29% CaO,
0.77% $Al_2O_3$,
0.41% $Na_2O_3$,
0.14% S.

TABLE 1

| Sample No. | Additive (parts by weight) | | | Silicic Compound | Cement Shaping Compressive Strength* (kg/cm²) | Appearance | Cement Composition Flow Value (mm) | | |
|---|---|---|---|---|---|---|---|---|---|
| | Sulfate | | Water Reducing Agent | | | | 5 Min | 15 Min | 30 Min |
| 1 | $Al_2(SO_4)_3.18H_2O$ | (3) | Condensation product of calcium naphthalenesulfonate and formalin | (1) Silica fume (2) | 166 | Excellent | 161 | 153 | 108 |
| 2 | " | (4) | Condensation product of calcium naphthalenesulfonate and formalin | (1) " | 180 | " | 150 | 141 | 107 |
| 3 | " | (5) | Condensation product of calcium naphthalenesulfonate and formalin | (1) " | 193 | " | 139 | 127 | 101 |
| 4 | " | (6) | Condensation product of calcium naphthalenesulfonate and formalin | (1.5) " | 198 | " | 160 | 152 | 138 |
| 5 | " | (6) | Condensation product of calcium naphthalenesulfonate and formalin | (1.5) — | 168 | " | 161 | 155 | 140 |
| 6 | $Al_2(SO_4)_3$ | (3) | Condensation product of calcium naphthalenesulfonate and formalin | (1) Silica fume (2) | 183 | " | 166 | 158 | 114 |
| 7 | $Al_2(SO_4)_3.18H_2O$ | (6) | Condensation product of melamine resin calcium sulfonate and formalin | (1.5) " | 194 | " | 132 | 119 | 101 |
| 8 | " | (6) | Condensation product of melamine resin calcium sulfonate and formalin | (1.5) — | 170 | " | 133 | 118 | 101 |

*Strength as measured immediately after demolding

EXAMPLE 2

Cement shapings were produced by repeating the same procedures for preparing Sample No. 3 in Example 1 except that the Norwegian silica fume was replaced by the silicic compound particles shown in Table 2. The properties of the cement shapings are shown in Table 2. The basic composition of the concrete cement was as follows:

| Components | parts by weight |
|---|---|
| Portland cement | 100 |
| Normal sand | 183 |
| Crushed stone | 339 |
| Water | 45 |
| $Al_2(SO_4)_3.18H_2O$ | 6 |
| Condensation product of calcium naphthalenesulfonate and formalin | 1.5 |
| Silicic compound particle | 2.0 |

TABLE 2

| Sample No. | Silicic Compound | Cement Shaping Appearance | Compressive Strength (at demolding, kg/cm²) | Concrete Cement Composition Slump Value (cm) | | |
|---|---|---|---|---|---|---|
| | | | | 5 Min | 15 Min | 30 Min |
| 13 | Silica fume | Excellent | 198 | 8.1 | 5.4 | 3.3 |
| 14 | $Na_2O.SiO_2$ | " | 196 | 6.2 | 5.5 | 3.2 |
| 15 | Quartz sand | " | 162 | 6.0 | 5.3 | 2.9 |
| 16 | $ZrSiO_4$ | " | 154 | 8.2 | 5.1 | 2.1 |
| 17 | $Al_2O_3.3SiO_2$ | " | 156 | 7.8 | 4.6 | 3.2 |
| 18 | Akakura pozzolan | " | 164 | 8.4 | 5.2 | 4.3 |
| 19 | CaSi dust | " | 183 | 8.3 | 5.6 | 3.8 |
| 20 | Kaolin | " | 139 | 8.6 | 5.5 | 3.9 |
| 21 | Diatomaceous | " | 137 | 8.6 | 4.3 | 4.0 |

TABLE 2-continued

| Sample No. | Silicic Compound | Cement Shaping Appearance | Compressive Strength (at demolding, kg/cm²) | Concrete Cement Composition Slump Value (cm) 5 Min | 15 Min | 30 Min |
|---|---|---|---|---|---|---|
| | earth | | | | | |

EXAMPLE 3

Cement compositions were prepared by compounding 100 parts by weight of normal Portland cement, 200 parts by weight of normal sand, 45 parts by weight of water and additives as shown in Table 3. The cement compositions prepared were shaped as in Example 1, and the properties of the resulting cement shapings are shown in Table 3.

Properties of the cement shapings are shown in Table 4. The basic composition of the concrete cement was as follows:

| Components | parts by weight |
|---|---|
| Portland cement | 100 |
| Normal sand | 183 |
| Crushed stone | 339 |
| Water | 45 |

TABLE 3

| Sample No. | Additive (parts by weight) Sulfate | | Water Reducing Agent | Silicic Compound | Cement Shaping Compressive Strength (at demolding kg/cm²) | Appearance | Cement Composition Flow Value (mm) 5 Min | 15 Min | 30 Min |
|---|---|---|---|---|---|---|---|---|---|
| 1 | $Al_2(SO_4)_3.18H_2O$ | (3) | Condensation product of sodium naphthalenesulfonate and formalin | (1) Silica fume (2) | 161 | Excellent | 166 | 158 | 111 |
| 2 | " | (4) | Condensation product of sodium naphthalenesulfonate and formalin | (1) " | 175 | " | 155 | 145 | 110 |
| 3 | " | (5) | Condensation product of sodium naphthalenesulfonate and formalin | (1) " | 187 | " | 143 | 131 | 104 |
| 4 | $Al_2(SO_4)_3$ | (3) | Condensation product of sodium naphthalenesulfonate and formalin | (1) " | 178 | " | 171 | 163 | 118 |
| 5 | $Al_2(SO_4)_3.18H_2O$ | (3) | Condensation product of melamine resin sodium sulfonate and formalin** | (1) " | 168 | " | 132 | 114 | 101 |
| 6 | " | (4) | Condensation product of melamine resin sodium sulfonate and formalin** | (1) " | 176 | " | 126 | 112 | 100 |
| 7 | " | (5) | Condensation product of melamine resin sodium sulfonate and formalin** | (1) " | 190 | " | 118 | 109 | 100 |
| 8 | $Al_2(SO_4)_3$ | (3) | Condensation product of melamine resin sodium sulfonate and formalin** | (1) " | 181 | " | 140 | 118 | 105 |
| 9 | $Al_2(SO_4)_3.18H_2O$ | (5) | Condensation product of sodium naphthalenesulfonate and formalin | (1) — | 151 | " | 142 | 125 | 105 |
| 10 | " | (6) | Condensation product of sodium naphthalenesulfonate and formalin | (1.5) — | 169 | " | 165 | 157 | 143 |

**NL-4000 (trade name) of Nisso Master Builders Co., Ltd.

EXAMPLE 4

Cement shapings were produced by repeating the procedures for preparing Sample No. 3 in Example 3 except that the Norwegian silica fume was replaced by the silicic compound particles shown in Table 4. The

| | |
|---|---|
| $Al_2(SO_4)_3.18H_2O$ | 5 |
| Condensation product of sodium naphthalenesulfonate and formalin | 1 |
| Silicic compound particle | 2 |

TABLE 4

| Sample No. | Silicic Compound | Cement Shaping Appearance | Compressive Strength (at demolding, kg/cm²) | Concrete Cement Composition Slump Value (cm) 5 Min | 15 Min | 30 Min |
|---|---|---|---|---|---|---|
| 13 | Silica fume | Excellent | 175 | 7.8 | 5.3 | 3.2 |
| 14 | $Na_2O.SiO_2$ | " | 173 | 6.1 | 5.4 | 3.0 |
| 15 | Quartz sand | " | 143 | 5.9 | 5.2 | 2.8 |
| 16 | $ZrSiO_4$ | " | 136 | 7.7 | 4.8 | 2.1 |
| 17 | $Al_2O_3.3SiO_2$ | " | 138 | 7.6 | 4.3 | 3.1 |

TABLE 4-continued

| Sample No. | Silicic Compound | Cement Shaping Appearance | Compressive Strength (at demolding, kg/cm²) | Concrete Cement Composition Slump Value (cm) 5 Min | 15 Min | 30 Min |
|---|---|---|---|---|---|---|
| 18 | Akakura pozzolan | " | 145 | 8.0 | 4.9 | 4.0 |
| 19 | CaSi dust | " | 162 | 7.9 | 5.3 | 3.8 |
| 20 | Kaolin | " | 123 | 8.2 | 5.2 | 3.7 |
| 21 | Diatomaceous earth | " | 121 | 8.3 | 4.1 | 3.9 |

While the invention has been described in detail and with reference to specific embodiments thereof, it will be apparent to one skilled in the art that various changes and modifications can be made therein without departing from the spirit and scope thereof.

What is claimed is:

1. A process for producing a shaped cement product, comprising:
   (i) providing a hydraulic cement composition consisting essentially of (1) 100 parts by weight of cement, (2) optionally, an amount of fine aggregate, (3) optionally, an amount of a coarse aggregate, (4) an amount of water and (5) 2 to 20 parts by weight of an additive having the following composition:
   (a) 1 part by weight of at least one sulfate selected from the group consisting of sulfuric acid salts of aluminum and sulfuric acid complex salts of aluminum,
   (b) 0.1 to 1 part by weight of a water reducing agent selected from the group consisting of a condensation product of sodium naphthalenesulfonate and formalin, a condensation product of melamine resin sodium sulfonate and formalin, a condensation product of calcium maphthalenesulfonate and formalin, and a condensation product of melamine resin calcium sulfonate and formalin, and
   (c) 0 to 5 parts by weight of a particulate silicic compound selected from the group consisting of Akakura pozzolan, having a particle size of 1 to 50 μm, and Al₂O₃.3SiO₂, ZrSiO₄, diatomaceous earth, bentonite, quartz sand, kaolin, CaSi dust, silica fume and Na₂O.SiO₂, each having a particle size of no more than 5 μm,
   (ii) placing said hydraulic cement composition in a framework; and
   (iii) curing the composition at a temperature between 80° C. and 100° C. at a temperature elevation rate of at least 40° C./hr.

2. The process as in claim 1, wherein the sulfate is hydrated aluminum sulfate.

3. The process as in claim 1, wherein the hydraulic cement composition charged into the framework is cured at a temperature between 80° C. and 110° C. without pre-curing.

4. The process as in claim 1 wherein 100 parts by weight of the cement is mixed with 100 to 300 parts by weight of the fine aggregate and 200 to 400 parts by weight of the coarse aggregate.

5. The process of claim 1, wherein said cement component is normal Portland cement, early strength Portland cement, moderate heat Portland cement, sulfate resistant Portland cement, white Porland cement, Portland blast-furnace slag cement, silica cement or fly ash cement.

6. The process of claim 1, wherein the aluminum sulfate salt is NH₄AlSO₄ and said complex aluminum salt is Al₂(SO₄)₃.14–18H₂O.

7. The process of claim 1, wherein said water reducing agent is the condensation product of formalin with a compound of the formula:

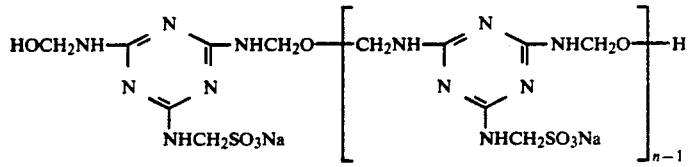

wherein n≧2

8. The process of claim 1, wherein said curing is effected at a temperature ranging from 90° C. to 110° C.

9. The process of claim 1, wherein said curing is accomplished by electric curing, electric heat curing, high frequency curing, heated air curing or infrared radiation curing.

10. The process of claim 1, wherein the amount of said silicic compound in said additive ranges from 0.1 to 3 parts by weight.

* * * * *